United States Patent [19]
Sumar et al.

[11] Patent Number: 5,838,768
[45] Date of Patent: Nov. 17, 1998

[54] SYSTEM AND METHOD FOR CONTROLLED MEDIA CONVERSION IN AN INTELLIGENT NETWORK

[75] Inventors: Gulamabbas Sumar, Sorögatan; Bo Arne Valdemar Åström, Telefonvägen; Björn Arne Svennesson, Kevingeringen, all of Sweden; Robert Johannes Bernardus Schmersel, AM Brunssum, Netherlands

[73] Assignee: Telefonaktiebolaget L M Ericsson, Stockholm, Sweden

[21] Appl. No.: 724,845

[22] Filed: Oct. 3, 1996

[51] Int. Cl.⁶ .................................................. H04M 1/64
[52] U.S. Cl. ........................... 379/89; 379/207; 379/230
[58] Field of Search ................................ 379/67, 88, 89, 379/207, 210, 214, 229, 230

[56] References Cited

U.S. PATENT DOCUMENTS

| | | | |
|---|---|---|---|
| 5,008,926 | 4/1991 | Misholi | 379/89 |
| 5,479,495 | 12/1995 | Blumhardt | 379/207 |
| 5,483,587 | 1/1996 | Hogan et al. | 379/202 |
| 5,680,442 | 10/1997 | Bartholomew et al. | 379/216 |
| 5,748,710 | 5/1998 | Lawtenschlager | 379/213 |

FOREIGN PATENT DOCUMENTS

| | | |
|---|---|---|
| 2216171 | 12/1994 | Canada . |
| 0 662 763 A2 | 7/1994 | European Pat. Off. . |
| 0 631 452 A1 | 12/1994 | European Pat. Off. . |
| 0 699 009 A1 | 2/1996 | European Pat. Off. . |
| 0 714 214 A2 | 5/1996 | European Pat. Off. . |
| WO 87/07801 | 12/1987 | WIPO . |
| WO 95/20857 | 8/1995 | WIPO . |

OTHER PUBLICATIONS

L. Dittrich, P. Holzner and M. Krumpe, *Implementation of the GSM–Data–Services Into the Mobile Radio System*, 11312 MRC Mobile Radio Confernece, Nice, France, Nov. 13–15, 1991, pp. 73–83.

Dieter Hochreuter, *ISDN–TK–System integriert Telefax–, Teletex– und PC–Kommunikation*, ISDN–Anwendungen, NTZ Nachrichten Technische Zeitschrift 45 (1992) Mai, No. 5, Berlin, DE, pp. 340–347 (not translated).

P. Baggia, A. Ciaramella, D. Clementino, L. Fissore, E. Gerbino, E. Gianchin, G. Micca, L. Nebbia, R. Pacifici, G. Pirano, and C. Rullent, *A man–machine dialogue system for speech access to E–mail information using the telephone: implementation and first results*, CSELT Technical Reports, vol. XX, No. 1, Mar. 1992, pp. 79–83.

T. Yoshida, M. Sasaoka and M. Ohyama, *A Voice Store and Forward System Based on DSP Technique and Its Performance*, The New World of the Information Society, ICCC—1985, pp. 631–636.

E. S. P. Allard, N. Day, *Switching of Information Services in the UK Network and Evolution Towards the Intelligent Network*, International Switching Symposoium, Stockholm, Sweden, May 27–Jun. 1, 1990, Session B2, Paper #1, vol. 1, pp. 119–122.

Judy E. Tschirgi, Praful B. Shanghavi and Earle H. West, *Speech Technology and Applications in the Intelligent Network*, IEEE 1992, pp. 0071–0075.

*Primary Examiner*—Fan S. Tsang
*Attorney, Agent, or Firm*—Jenkens & Gilchrist, P.C.

[57] ABSTRACT

A system and method for the conversion of messages from one medium to another in an Intelligent Network (IN) telecommunications system comprising several Intelligent Peripherals (IPs) connected to a Service Control Point (SCP) over a network. The various IPs are also linked to each other over a distinct telecommunications backbone. The SCP orders a conversion IP to retrieve the received message over the telecommunications backbone and convert it to a specified medium, which may optionally be specified by the recipient. When the conversion process is complete, the SCP orders a delivery IP to retrieve and deliver the converted message to the intended recipient.

33 Claims, 10 Drawing Sheets

|      | SCEF | SMF | SDF | SCF | SSF | SRF | CCF |
|------|------|-----|-----|-----|-----|-----|-----|
| SCEP | X    |     |     |     |     |     |     |
| SMP  |      | X   |     |     |     |     |     |
| SDP  |      |     | X   |     |     |     |     |
| SCP  |      |     | (X) | X   |     |     |     |
| IP   |      |     |     |     |     | X   |     |
| SSP  |      |     |     |     | X   | (X) | X   |
| SSCP |      |     | (X) | X   | X   | (X) | X   |
| SN   |      |     | (X) | X   | X   | (X) | X   |
| NAP  |      |     |     |     |     |     | X   |

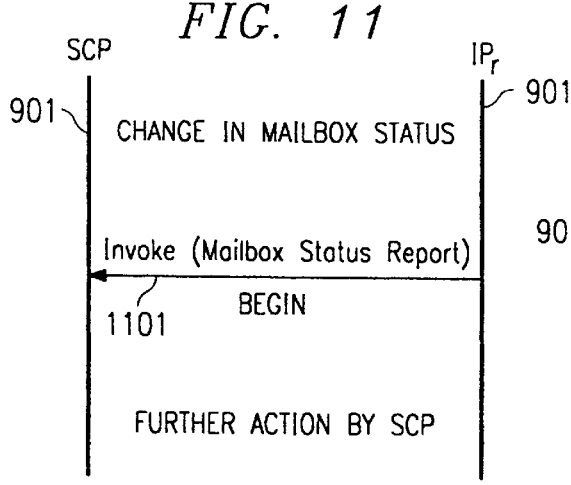
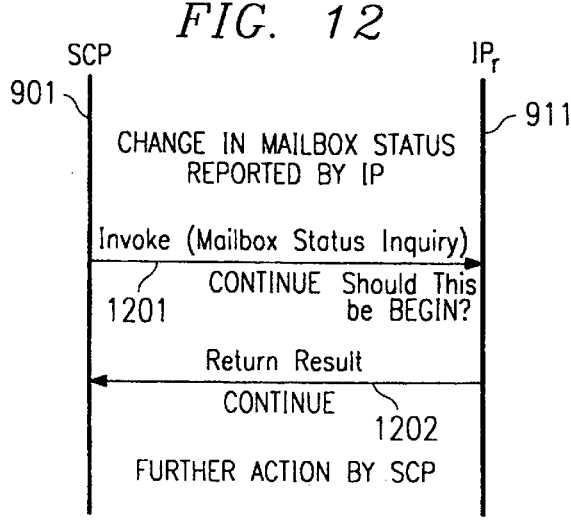
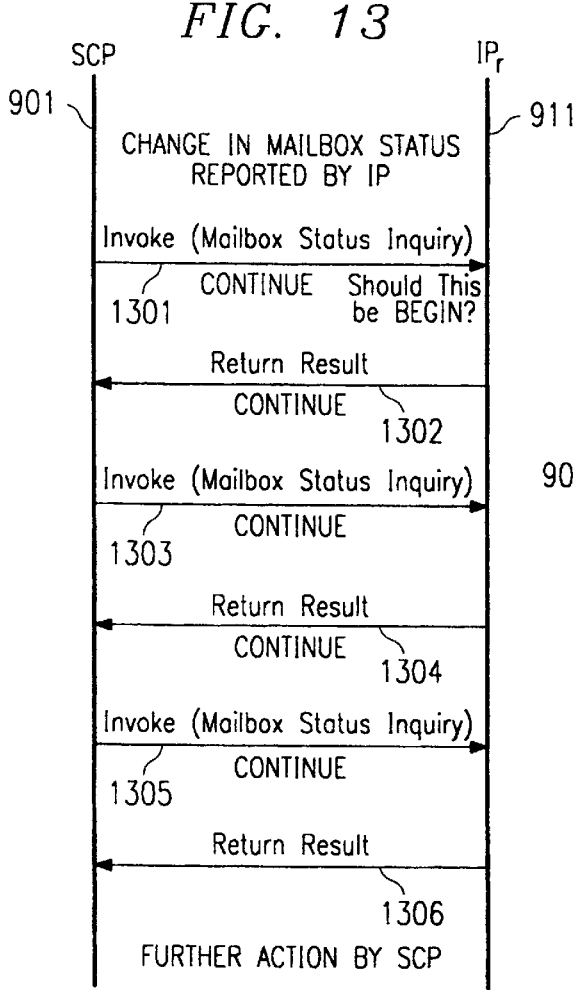
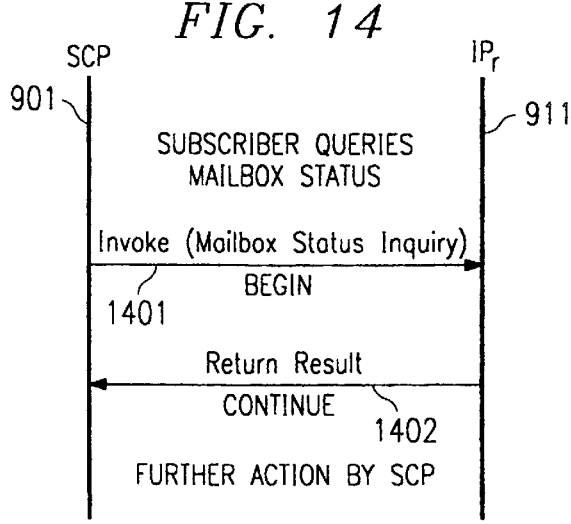

5,838,768

SYSTEM AND METHOD FOR CONTROLLED MEDIA CONVERSION IN AN INTELLIGENT NETWORK

CROSS REFERENCES TO RELATED APPLICATIONS

This U.S. Patent Application contains subject matter related to the following, co-pending U.S. Patent Applications: (1) System and Method for Subscriber Activity Supervision, Ser. No. 08/723,620 (Attorney Docket No. 27946-00157), filed Oct. 3, 1996, in the names of Bo Arne Valdemar ÅSTRÖM, Robert Johannes Bernardus SCHMERSEL, Gulamabbas SUMAR and Björn Arne SVENNESSON; (2) System and Method for Incoming and Outgoing Interrogations for Store-and-Forward Services, Ser. No. 08/724,769 (Attorney Docket No. 27946-00158), filed Oct. 3, 1996, in the names of Bo Arne Valdemar ÅSTRÖM, Robert Johannes Bernardus SCHMERSEL, Gulamabbas SUMAR and Björn Arne SVENNESSON; and (3) System and Method for Ip-Activated Call Setup, Ser. No. (Attorney Docket No. 27946-00159), filed Oct. 3, 1996, in the names of Bo Arne Valdemar ÅSTRÖM, Robert Johannes Bernardus SCHMERSEL, Gulamabbas SUMAR and Björn Arne SVENNESSON. These co-pending Patent Applications and any other domestic or foreign Patent Applications deriving therefrom and the disclosure(s) contained therein are all hereby incorporated by reference herein.

The present Patent Application and all the related co-pending Patent Applications identified above have been or will be assigned to Telefonaktiebolaget LM Ericsson (publ).

DESCRIPTION

1. Technical Field of the Invention

The invention relates to the provision of supplementary telecommunications services, and more particularly, to a system and method for facilitating the conversion of messages received in one medium into another medium.

2. Description of Related Art

Customer demand for customized telecommunications services has been growing ever more rapidly. Special subscriber features such as Call Waiting, Call Forwarding, Abbreviated Dialing, etc., are becoming increasingly important to individual subscribers for the added convenience they provide, as well as to telecommunications service providers as sources of additional revenue. Such services are generally provided by special programming in the software of the central office exchange serving a particular subscriber. That is, the local exchange switch software is separately programmed to provide special service features to the subscribers connected thereto. Often both the hardware and the software of an exchange must be upgraded in order to enable the provision of special subscriber functionality.

When a call involves an interconnection between two parties connected to different exchanges, it is completed via a so-called transit or tandem exchange which forms part of the network interconnecting individual central office switches to one another. In such cases, the transit exchange is totally transparent to the two parties of the call and simply provides a voice path between the two end offices. Any special service features invoked by either party has traditionally been provided by the end office to which that subscriber is connected, independently of the network connection between the two parties.

In most telecommunications systems providing Plain Old Telephone Service (POTS), the communications link between a calling party (A-Party) and the called party (B-Party) is under the control of the A-Party. Consequently, the communications link between the A-Party and the B-Party remains in place until the A-Party's telephone instrument is placed "on-hook" in which case the system breaks the communications link and the end offices of both parties and in any transit exchange's which have been used to link the end offices together. If the B-Party were to place his or her telephone instrument on-hook, it has little effect until after a period of the order of several minutes when a timer triggers the disconnection of the circuits between the calling and the called parties. In newer types of telecommunications services, such as the Integrated Services Digital Network (ISDN), B-Party disconnect is employed but the mechanisms for implementing it are considerably different from those of conventional POTS networks.

Providing special subscriber services within conventional telecommunications exchange requires an extensive upgrading of the software of each and every individual exchange which is to furnish such special services to its customers. Such upgrading of exchanges is often extremely expensive and virtually prohibitive from a cost-effectiveness standpoint with regard to the additional revenue provided by the additional subscriber services. This observation is even more true in small towns or rural areas where the demand for special subscriber services is relatively low and where existing exchanges have been in place for a considerable period of time and continue to adequately serve the basic telecommunications needs of a majority of the subscribers in that area.

The telecommunications business is facing increasing competitive pressures. The per-minute revenues of telecommunications operators everywhere has been steadily decreasing due to a number of factors. The deregulation of telecommunications services has increased the number of competitors in the business. Further, innovations like call-back services and calling cards permit users to arbitrage differences in bilateral calling rates between country pairs. Also, cable television companies have now started offering telephone services over their cable networks. Finally, innovative software has now made high-quality full-duplex calls over the Internet feasible.

Improvements in technology have also reduced the cost of providing basic telephone service. The telecommunications companies can no longer justify the relatively high tariffs levied on the provision of basic telephone services. Improvements in technology have lowered the actual cost of delivering a telephone call to virtually nothing. In economic terms, basic telephone services can be viewed as zero marginal cost business. The advances that have increased the power to price performance ratio of desktop computers over the years have also boosted the reliability and efficiency of modern telephone exchanges.

The same situation obtains on interexchange connections also. Due to the use of optical fibre, a substantial amount of capacity has been added to the telephone networks. Bandwidth no longer appears to be the scarce resource that it was just a few years ago, and, in fact has become a commodity that is frequently bought and sold in wholesale quantities.

Improvements in technology have also reduced or eliminated the effects of the geographic distance between a calling party and a called party as a significant factor in the cost of providing a telephone call. It has been argued that it cost no more in terms of network resources to call from Stockholm to Dallas (a distance of about 8,000 kilometers) than it does to call from Dallas to Austin (a distance of about 300 kilometers).

The explosive growth of the Internet has largely been due to the exploitation of the fact that its basic TCP/IP protocol permits e-mail messages to be sent and file transfers to be effected independent of the transmission distances involved.

In spite of the fact that the provision of long distance services does not cost much more than that of local basic telephone services, telecommunications operators continue to charge more for long distance telephone calls than for local calls. The increase in competition in the telecommunications industry is likely to make that situation increasingly unsustainable. Since long distance calls have traditionally been a significant source of the operating profits of the telecommunications companies, it has become increasingly obvious that the telecommunications companies need to find new sources of revenue.

One way in which telecommunications operators can increase revenues is by offering subscribers advanced services for which the subscribers would be willing to pay a premium for. As described earlier, in the network architectures of the past, the additional of new functionality to a network required that core exchange software be rewritten—an expensive and lengthy process that also carried the additional risk of introducing new bugs into the system. Furthermore, each exchange in the network has to be updated with the new software which further increased the cost of introducing new services. Telecommunications operators are no longer willing to tolerate such a state of affairs. There are great business opportunities for a telecommunications equipment manufacturer who can bring a product to the market first.

Telecommunications operators have expressed a need for faster and less expensive techniques for the introduction of new services into their telecommunications network. Further, they have desired that the impact of the new functionality be limited to one or a few exchanges only. It has also been found desirable for service-administration tasks such as the installation or modification of services, the addition of customer-specific data, etc., be capable of being handled from a central management facility.

It has also been desired that the design and implementation of the new services be done by the telecommunications operators rather than the equipment manufacturer. This would allow telecommunications operators to quickly react to perceived market needs and serve their customers more effectively and efficiently. It has also been found desirable to incorporate greater intelligence in the exchange software to permit various services to interact with subscribers. In this manner, the telephone instrument can become an advanced interface to the telecommunications network.

The Intelligent Network (IN) has been proposed as a solution to address the above requirements. The IN technology is designed to allow a telecommunications operator to design its own set of unique services or to adapt existing services to specific customer requirements. Further, the IN architecture permits the impact of installation of new services to be limited to a few control nodes.

Another design feature of the IN architecture is its centralized administration of services. This improves the response time and decreases the human resource overhead required to run the network. Furthermore, the IN architecture permits customer control of some customer-specific data.

For example, some telecommunications operators offer "personal number" services. The personal number service involves giving each subscriber a specific telephone number, usually one prefixed with an "area code" of 500. The design philosophy behind the personal number service is to supplant the plethora of contact numbers for each subscriber with just one phone number. Thus, when someone dials a subscriber's personal number, the exchange switch will query a central database and obtain a list of all of the telephone numbers where the subscriber might possibly be reached. The switch will then ring each of those numbers in a predetermined order until the call gets answered.

In one variant of this service, a subscriber may be provided the ability to dynamically update the contact number database from any telephone instrument. Such customer control can permit a subscriber to add the number of a hotel or other location where he or she may be temporarily located.

The design philosophy behind the IN architecture is to reduce the time to market for the provision of new services, to lower development and administration costs, and to enhance profits deriving from the provision of premium services. The classic example of an IN service is the use of a single dialed number (the B-number) by customers spanning a large geographic area that is redirected to one of a plurality of local service centers. Thus, a pizza franchise can advertise a single telephone number for ordering pizzas. Whenever a customer dials the advertised number, the IN service can direct the call to the nearest franchisee based upon the number of the dialing subscriber (the A-number). A Brief History of IN The Intelligent Network concept originated in the United States. Originally, the intent was to provide a central database for translating a single dialed number into a different terminating number. One of the earliest applications of IN services was to provide toll free calling ("Freephone").

Toll free numbers do not directly correspond to a physical telephone line, but need to be translated into an actual termination number. The translation may be dependent upon the location of the caller and upon the time of day.

A new signaling system called Signaling System No. 7 (SS7) was developed to allow high-speed communications between telephone exchanges before and during call setup. The SS7 protocol allowed for the first time, the fast database lookups needed for the implementation of toll-free calling. After the development of the SS7 technology, it became possible to exchange data across a telephone network virtually instantaneously. This was the genesis of the Intelligent Network.

The next step in the revolution of the IN was to move from static databases to dynamic ones that permitted customer control of customer-specific data. Additional interactivity came to be permitted when subscribers could control the progress of the call by keypad interaction from the subscriber's instrument. Such interactive IN is referred to in the U.S. as the Advanced Intelligent Network (AIN).

Present development and interest in the IN architecture is being driven by a few large-scale applications. Two such applications are the Universal Personal Number (UPN) Service and Virtual Private Network (VPN) Service. In the UPN service, a unique number is assigned to each individual rather than to a telephone instrument. The UPN number can be used to reach a subscriber irrespective of his or her location or type of network (whether fixed or mobile).

The VPN service allows a private network to be constructed using public network resources. Thus, a corporation could have a corporate telephone network that permits all of its employees to communicate with each other without investing in the hardware or software needed for providing a physical private network. By implementing a VPN service using the public network, a corporate customer can also avoid the costs of maintaining a physical network.

Inadequacies of Present IN Systems

The use of the Intelligent Network (IN) architecture has been advocated as a solution for speeding up the incorporation and roll out of new network capabilities and network services. However, the presently articulated standards for implementing IN concepts suffer from a number of shortcomings.

For example, subscribers may receive incoming non-call-related messages such as electronic mail (e-mail), pager messages, messages in Short Message Service (SMS) format, etc. Traditionally, each of these message types has been dealt with separately and they have been delivered to an intended recipient through a mailbox specific to the message type. Consequently, a subscriber has to check a facsimile message mailbox to determine whether any facsimile messages have been received and are awaiting attention, and separately check his electronic mail message mailbox to determine whether any e-mail messages remain unread, etc.

Service providers have found that subscribers would like to have incoming messages that are received in a variety of permitted input formats to be translated or converted from one medium to another prior to delivery to the subscriber. Each subscriber may have a different preference about the format in which his or her incoming messages should be delivered in. Thus, for example, Subscriber A might like to receive an e-mail notification every time he or she receives a facsimile transmission, but might like the contents of the facsimile transmission read to him or stored in his voice mailbox for later retrieval and review.

If a telecommunications service provider were able to store each subscriber's notification and delivery preferences, and perhaps even permit interactive selection of a preferred receipt format by a subscriber, then the service provider would be able to provide enhanced value to the subscriber and thus reap additional revenues.

Thus, it would be highly desirable to be able to provide some means within an Intelligent Network system, to convert messages received in one medium to another medium based upon stored customer preferences or by interactive dialogue with a subscriber. This in turn requires a system and method for receiving, storing, converting and forwarding non-call-related messages from one medium to another.

SUMMARY OF THE INVENTION

Therefore it is a primary object of the present invention to permit the easy conversion of a message received in one medium into a second medium. One embodiment of the present invention has been implemented in an IN (Intelligent Network) telecommunications system comprising a plurality of IPs (Intelligent Peripherals) connected to an SCP (Service Control Point) over a network. The plurality of IPs are further connected to each other. In an embodiment of the present invention, a first message in a first medium is received into a recipient IP. This received first message is then transported from the recipient IP to a conversion IP. The transported first message is next converted into a second message in a second medium in the conversion IP. The converted second message is then transported over the telecommunications backbone to a delivery IP. Finally, the converted second message is delivered to the intended recipient of the message in the second medium.

BRIEF DESCRIPTION OF THE DRAWINGS

A more complete understanding of the method and system of the present invention may be obtained by reference of the detailed description of the preferred embodiments that follow, taken in conjunction with the accompanying drawings, wherein:

FIG. 11 is a sequence diagram illustrating the operation of the "Mailbox Status Report" command;

FIG. 12 is a sequence diagram illustrating the operation of the "Mailbox Status Enquiry" command when the SCP asks for brief information about mailbox status;

FIG. 13 is a sequence diagram illustrating the operation of the "Mailbox Status Enquiry" command when the SCP asks for detailed information about mailbox status;

FIG. 14 is a sequence diagram illustrating the operation of the "Mailbox Status Inquiry" command when a subscriber asks for brief information about mailbox status;

DETAILED DESCRIPTION

The present invention provides a solution to a set of problems concerning the conversion and delivery of messages that have been received in one medium, such as in electronic mail (e-mail) message format, facsimile format or in SMS (Short Message Service) format, to subscribers who wish to receive the messages in a different format. The extensions to the IN concept disclosed and described in this application can also be used in other telecommunications contexts and can also facilitate the provision of related supplementary subscriber services.

Intelligent Network (IN) Architecture

An Intelligent Network is a telecommunications network architecture that provides flexibility for facilitating the introduction of new capabilities and services into a network such as the Public Switched Telecommunications Network (PSTN) or a Public Land Mobile Network (PLMN). Examples of such new capabilities and services include toll free calling ("Free Phone"), credit card services and Virtual Private Networks (VPN).

IN embodies the dreams of the unbundled network of the future in which freedom is given to service providers and users to personalize the network services, independently of access, switch term technology and network providers. An international consensus view on IN is described in the ITU-TS Recommendation Q.1200.

Figure 1:
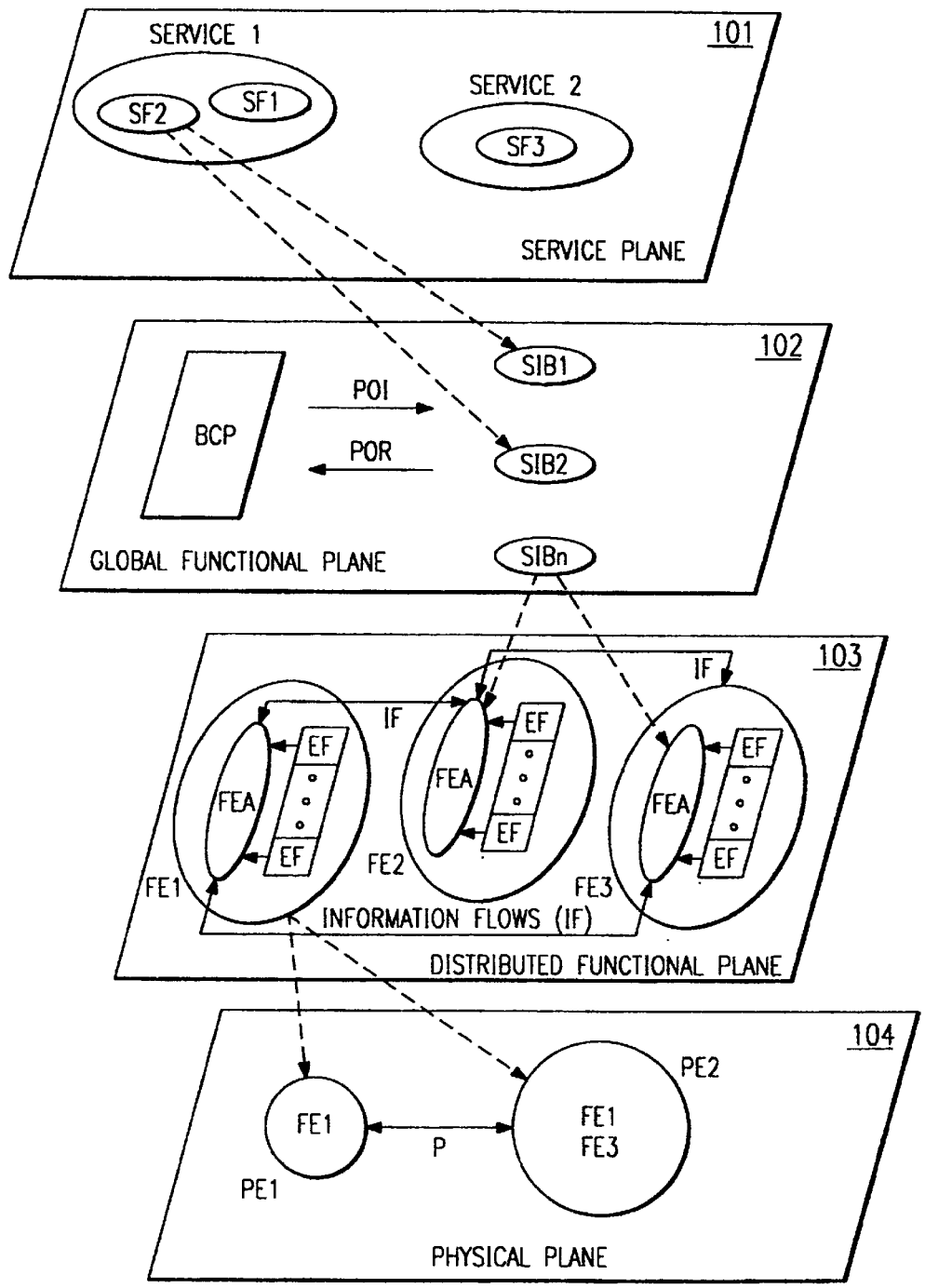
FIG. 1 is illustrative diagram showing a standard Intelligent Network (IN) Conceptual Model.

The details of the IN architecture have been specified in the International Telecommunications Union (ITU) Recommendation I.312/Q.1201 which also contains a verbal explanation of the IN Conceptual Model (INCM) shown in FIG. 1. The ITU's IN Conceptual Model analyzes and systematizes the various tasks and processes associated with call handling and the provision of services into four planes: a Service Plane 101, a Global Function Plane 102, a Distributed Function Plane 103, and a Physical Plane 104.

So far, IN has been concentrated around a group of services referred to hereafter as Number Services, for example, toll free calling ("Free Phone"), credit card calling, personal number services, televoting, etc. A key characteristic of all these services is that they provide service to numbers that are unbundled from the access ports in the access nodes. Any node in the telecommunications network can be made a service node by the addition of a Service Switching Function (SSF) and/or Special Resource Function (SRF), both under control from a Service Control Function (SCF) via a service-independent protocol interface. The SCF is supported by a Service Data Function (SDF), which may be physically unbundled from the node.

The main building blocks of IN are the SSF, the SCF, the SDF and the SRF. The SRF is also referred to hereafter as the logical Intelligent Peripheral (logical IP). Each of these building blocks is a separate logical entity which may, but need not, be physically integrated with the other entities of the telephone network, logical or otherwise. The physical and logical entities are referred to interchangeably as one in the following description of the preferred embodiment.

Figure 2:
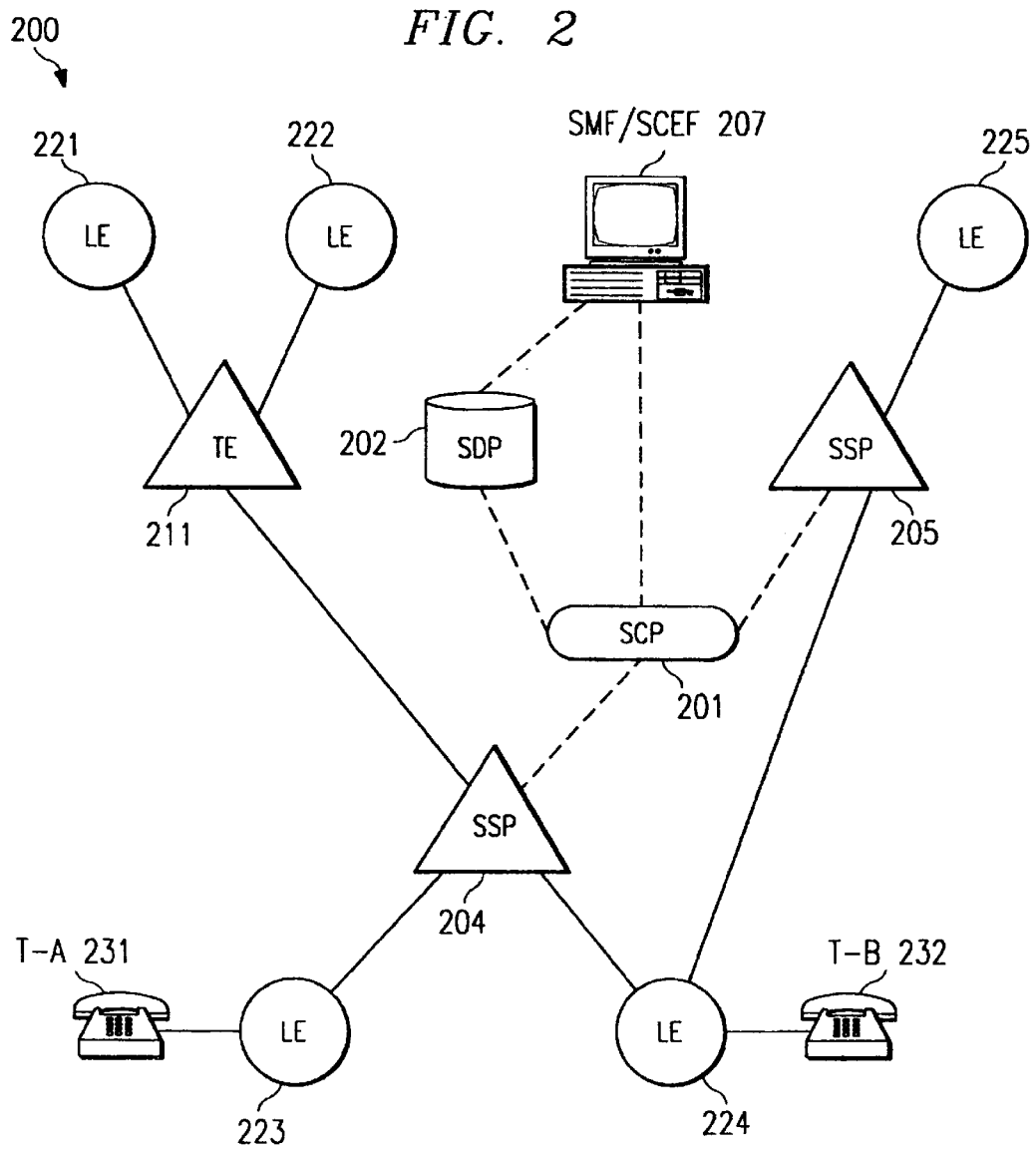
FIG. 2 shows the components of an exemplary simple Intelligent Network.

The IN architecture divides the basic call process into discrete, strictly-defined stages that gives telecommunications service providers and subscribers the ability to manipulate the call process. The components of a simple Intelligent Network 200 is shown in FIG. 2. The standard architecture of the Intelligent Network has defined various components of the IN as well as the interfaces between the individual components.

When a call is made to an IN service, the call is first routed to a special node in the network that is called the Service Switching Point (SSP). If the SSP recognizes an incoming call as an IN call, then all further processing of the call is suspended while the SSP informs the Service Control Point (SCP), another node in the IN system, that an IN call has been received.

The SCP provides the "intelligence" in the "Intelligent Network." The SCP controls everything that happens to an IN call and makes all of the call processing decisions. When the SCP decides upon the appropriate action that is to be performed on the call, the SCP instructs the SSP to carry out the necessary action.

The Service Control Function (SCF) contains the logic of an IN service and bears the complete responsibility for making decisions related to a call invoking that service. This service logic may run on any telecommunications platform (e.g., Ericsson's AXE platform or UNIX). The node (i.e., the physical hardware and the software) that contains the SCF is called the Service Control Point (SCP) 201.

The data needed for each service (e.g., the list of subscriber telephone numbers) is provided by the Service Data Function (SDF). In one implementation of the IN architecture, the data needed for the services is stored in the SCF itself. Formally, the function of storing the service-related data is allocated to the SDF which provides the data upon demand to the SCF. In a typical IN implementation, the SDF can be UNIX's machine running a commercially-available database program such as Sybase. The physical node that contains the SDF is referred to as the Service Data Point (SDP) 202.

The normal call handling and supervisory functions of an exchange are performed by the Call Control Function (CCF). While the CCF is not formally part of the standard IN architecture, the CCF provides the IN with information about calls and also executes orders that have been received by the SSF.

The Service Switching Function (SSF) interprets the instructions sent by the SCF and passes the commands to be executed to the CCF. The SSF also receives call event data (e.g., the onhook/offhook status of a subscriber or a subscriber line being busy) from the CCF and passes the data to the SCF. The physical node (i.e., the exchange hardware and software) that contains the SSF is referred to as the Service Switching Point (SSP) 204 and 205.

The Specialized Resource Function (SRF) provides certain resources for use in IN services, e.g., DTMF (Dual Tone Multiple Frequency) digit reception, announcements and speech recognition. In the ITU IN recommendations, the SRF communicates directly with the SCF. In another implementation of the IN, the SRF functionality may be co-located with the SSF. In this case the SRF does not communicate directly with the SCF, but via the SSF. The SRF is not shown in FIG. 2.

The Service Management Function (SMF) 207 administers the maintenance of IN services, e.g., the addition or removal of data or the installation or the revision of services. The Service Creation Environment Function (SCEF) 207 allows an IN service to be developed, tested and input to the SMF. In one implementation of the IN, the SMF and the SCEF are combined into one and termed the Service Management Application System (SMAS). The SMAS application is part of the TMOS family and runs under the UNIX operating system. It permits services to be designed using a graphical interface and provides convenient forms for the entry of service data.

FIG. 2 shows an exemplary SCP 201 connected to an SDP 202 and SSPs 204 and 205. The SCP is also connected to an SMF/SCEF 207. All of the links running to and from the SCP 201 are shown as dashed lines in FIG. 2 to indicate that they are not voice links. The SDP 202 is also connected by a non-voice link to the SMF/SCEF 207. The SSP 204 is connected to two local exchanges (LEs) 223 and 224 as well as to a transit exchange (TE) 211. The transit exchange 211 in turn is connected to two other local exchanges 221 and 222. The SSP 205 is connected to local exchange 225. The local exchanges 223 and 224 are shown in FIG. 2 to be connected to an exemplary originating subscriber T-A 231 as well as to an exemplary terminating subscriber T-B 232.

If each of the logical building blocks of the IN are also physical entities, in the notation described earlier, the corresponding physical nodes are called the Service Switching Point (SSP), the Service Control Point (SCP), the Service Data Point (SDP), and the physical Intelligent Peripheral (IP). As stated earlier, in the discussion that follows, the term IP is used to generally refer to both a logical IP as well as a physical IP.

The user agent is identified in the SCF by the calling or the called party number, and invoked when an armed trigger point in the serving node is hit. Signaling data and call state data can be manipulated by the user agent. The SRFs are capable of in-band communication with the users or with each other to overcome limitations in the current signaling systems.

Current IN standards assume that the visited location and the home location of a subscriber are collocated but possibly unbundled from the access node and the service node. Although the separation of the access node and the service node functions reduces service introduction costs, it results in potentially unwanted interactions between access port services and number-based services. An enhancement of the access node to a service node is therefore required to provide flexibility in service design.

An alternative would be to add two remotely changeable personal telecommunications categories to the access nodes—one providing an unconditional hot-line connection to the service node for originating calls, and the other giving an unconditional call forwarding to the service node for terminating calls. It appears necessary in the longer term to separate the visited and home location functions as in cellular networks if costs are to be reduced and capacity is to be improved.

Figure 3:
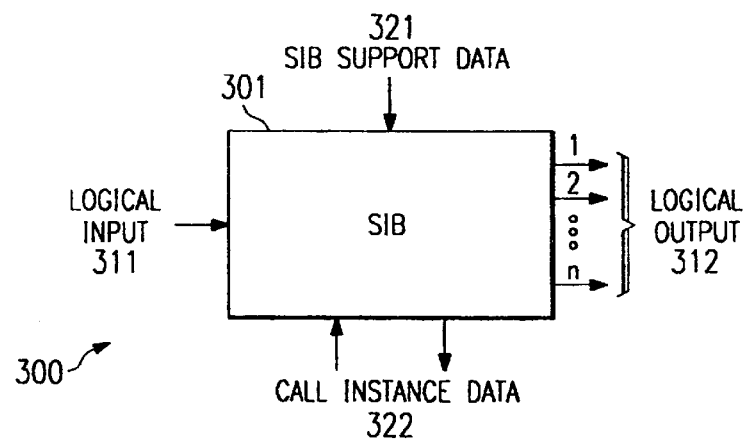
FIG. 3 shows the structure of a Service Independent Building Block (SIB)

One of the unique characteristic of IN is that services are implemented on the IN service platform based on its service independent building blocks (SIBs), and not directly in the network nodes. The SIBs are part of the SCP. FIG. 3 shows the structure of a SIB. Each SIB 301 is an elementary logical element in a service logic that hides the implementation from the programmer. When existing SIBs cannot meet a new requirement, new SIBs are defined. As shown, the SIB 301 receives a logical input 311, generates logical outputs 312, receives SIB support data 321, and receives and generates call instance data 322.

In IN products, the SIBs 301 perform functions such as analysis of signaling information, control of connection topology, interaction with the user, reading and writing of data, collection and output of call data, etc. Other SIBs are pure language elements such as jump, go to subroutine, loop, handover, etc. Each SIB 301 is available in the service platform. Service Logic Programs (SLPs) are built by SIBs 301 and refer to by their names. Service logic can be designed using a Service Creation Environment Function (SCEF). The SIBs 301 are made available to the SCEF through a system-independent Application Programming Interface (API).

Figures 4, 5:
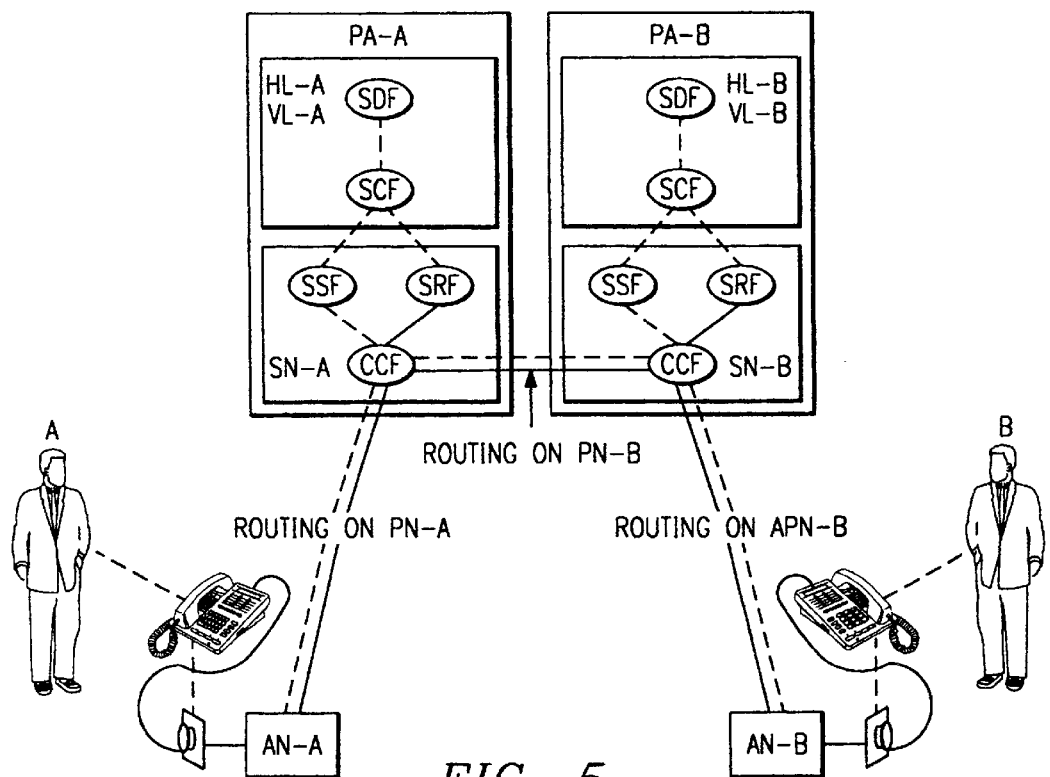
FIG. 4 shows the mapping of the various IN functional entities into physical units.
FIG. 5 shows an example of an IN implementation with service nodes at the transit level.

The mapping of the various IN functional entities into physical units or entities is shown in FIG. 4 where the suffix "F" stands for the various functional entities and the suffix "P" stands for physical entities. In FIG. 4, the acronym SMF refers to the Service Management Function and the acronym CCF refers to the Call Control Function.

An example of an IN implementation with service nodes at the transit level is illustrated in FIG. 5. The service nodes shown in FIG. 5 can be reached from any access node such as a local switch in PSTN or ISDN or an MSC in a Public Land Mobile Network (PLMN) system. The service nodes can serve both personal telephony as well as other number-based services. User identities and authentication information may be transferred in-band to the SRF or embedded in calling- and called-party number fields in the signaling systems.

The personal agent has components in the Call Control Function, CCF (i.e., the trigger point data), the Service Control Function, SCF (i.e., the service logic), and in the Service Data Function, SDF (i.e., the service data). The IN platform components illustrated in FIG. 5 can be either integrated into the access nodes or implemented in separate service nodes.

The role of the Service Switching Function (SSF) is to recognize that a call is invoking an IN service, and then to communicate with the SCF to receive instructions about how to handle the call. The SCF is where the intelligence of the IN resides as it contains the logic required to execute various services. The SDF is a database system that provides the data storage capacity needed for the data intensive supplementary services. The IP is the network element that provides resources for user interaction such as voice announcements and dialogue, dual tone multi-frequency reception (DTMF) and voice recognition.

The IN Application Programming Interface (API)

Figure 6:
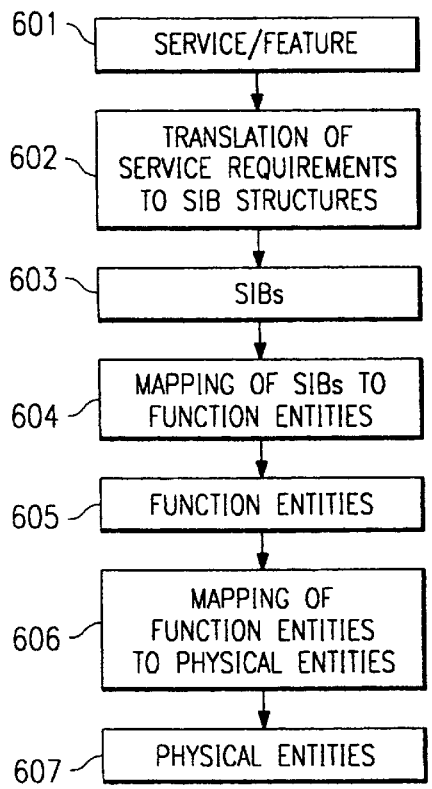
FIG. 6 shows the preferred methodology for implementing various services in the IN Conceptual Model.

The ITU's IN Conceptual Model shown in FIG. 1 also defines the methodology for implementing various services. This is shown in FIG. 6. In order to implement a service or feature 601, the service requirements are first translated to SIB structures at 602. The resulting SIBs 603 are mapped at 604 to various Functional Entities 605. The Functional Entities 605 in turn are mapped at 606 to one or more Physical Entities 607.

It should be noted that unlike the practice with all non-IN standards, the service requirements in IN are not directly translated into network functionality. Instead, the service requirements are translated into service platform elements (i.e., SIBs) which in turn are implemented according to the IN three-stage model to become reusable capabilities and protocol elements in the telecommunications network.

There are at least two possible approaches toward implementing the Application Program Interface (API) that conform to the ITU's IN Conceptual Model shown in FIG. 1. One approach would be to split the service logic into two parts: a fixed logic part and a flexible logic part. The SIBs are then linked to form decision graphs that are called as subroutines by the fixed logic. The fixed logic can be expressed in a standard programming language such as C or C++, etc., and compiled and loaded into a standard execution environment. The flexible logic part, in contrast, consists only of exchangeable data.

The second approach would be to define a service API that gives full control over all aspects of the logic by combining SIBs with each other to achieve the desired function. Each SIB can be linked to any other SIB in this approach. Some SIBs perform a telecommunications function while others are only linking elements in the logic. All logic is expressed as data that describes which SIBs are to be used, how they are linked, and what data each SIB is to use to perform its function. All implementation details are thus hidden from the service programmer. This is the principal approach taken in Ericsson's IN products.

Figure 7A:
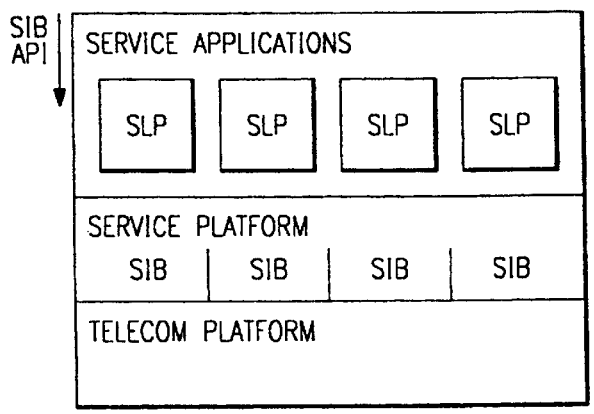
FIG. 7a & 7b illustrates the two approaches towards implementing an API.
Figure 7B:
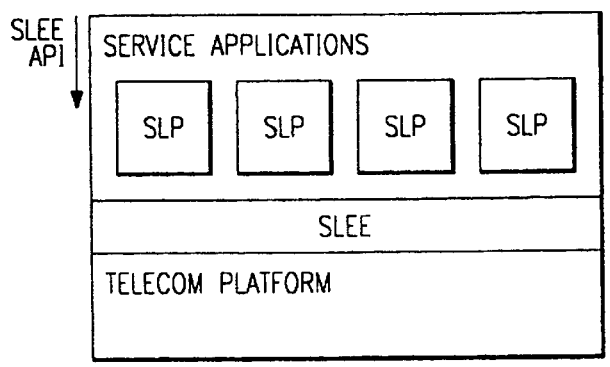

The two approaches toward implementing the API are illustrated in FIG. 7. The SIB-platform approach is shown in FIG. 7A, and the Service Logic Execution Environment (SLEE) approach is shown in FIG. 7B. The SIB approach of FIG. 7A expresses all service logic as a combination of elementary SIB functions that are available in the service platform to form flexible service profiles (FSPs). The SLEE approach shown in FIG. 7B considers the SIBs as subroutines to the fixed logic expressed in a programming language such as C, C++, Service Logic Programs (SLPs), etc. The compiled code uses telecommunications platform primitives, such as INAP (Intelligent Network Application Part) operations and database primitives.

Figure 8:
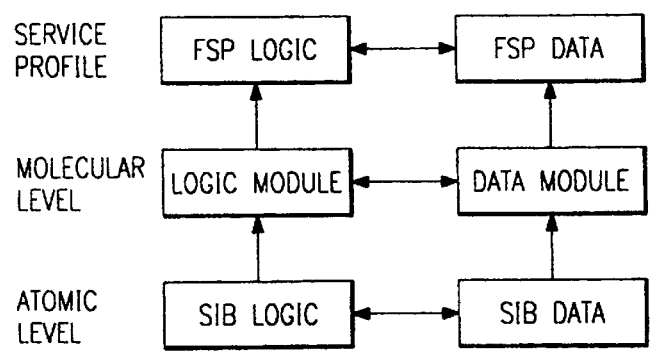
FIG. 8 shows one technique for defining personal agents using Service Logic Programs (SLPs)

When the same data representation is used for all logic and data, personal agents can be defined by means of Flexible Service Profiles (FSPs), as shown in FIG. 8. This arrangement offers a number of advantages, for example, permitting different logic elements to be loaded and activated without disrupting service, and in case of a fault in a personal agent, limiting the affected zone to only calls activating the faulty function.

Feature interaction has been a major obstacle in the development of IN systems. This problem arises from the fact that each feature is normally dependent on other features. There is a need to resolve such interactions, but no solution has yet been agreed on. It has been found in practice that existing feature implementations are often affected and many have to be redesigned or completely blocked when new features are introduced. It should be noted that this problem can be approached from two viewpoints: the network-centric view and the user-centric view of IN systems.

The traditional network-centric view sees IN as a complement to other technologies in adding supplementary services to an existing repertoire. Feature interaction has and continues to be the obstacle that prevents this view from being a realistic alternative. Each new supplementary service is composed of a fixed service logic part, and potentially of a flexible logic part. Personalization is thus limited to what can be achieved by combining a number of pre-defined supplementary services or features with each other. The addition of a new service may require long and costly development, not different from the pre-IN experiences in PSTN, PLMN and ISDN. The central issue in this viewpoint is not the design of a new feature, but on the task of integrating a new feature with other preexisting features.

In contrast, the user-centric view of IN focuses on the users rather than on the features. In principle, the needs of individual users are assumed to be unique, with the service provider being in full control of all service logic. The FSP approach is applied, and the result is that a range of unique service profiles can then be created by reusing SIBs rather than reusing features. This means that feature interaction ceases to be a problem, since no individual features are implemented. The interaction between the SIBs constitutes the service logic in this approach.

Interaction between service profiles in this approach is resolved through open signaling interfaces according to the half-call model. Before complete control can be provided from the step-wise developed IN platforms in an economically feasible way, it has been found necessary to use some of the existing supplementary services. It should be borne in mind that this is a shortcut that can result in interaction problems requiring enhancement of the IN platform in the future.

The principal goal in the user-centric view is to make the SIBs standardized so as to achieve both service-independence and system-independence and technology-independence. When this is achieved, a SIB-based service profile can be executed on any compatible platform, whether it is a switch processor, a stand-alone personal computer, or work-station. The old paradigm, giving the same features to all subscribers, is replaced by feature transparency for each individual subscriber, irrespective of access.

IN Signaling

The Intelligent Network Application Part (INAP) Protocol is used for signaling in IN systems. The INAP signaling protocol has been standardized by both the European Telecommunications Standards Institute (ETSI) and the International Telecommunications Union (ITU), and includes the CCITT Signaling System No. 7 (CCS7) which is one, but not the only network protocol that may be used to support INAP.

One of the shortcomings of the core INAP as it is specified today (i.e., the IN CS-1 standard), is that the communication possibilities between the SCF and the IPs are restricted to speech only. Other media such as e-mail, facsimile, data, etc. are currently not supported by the CS-1 standard. Thus, non-call-related and non-real time call-related services are not included in the present CS-1 standard.

The Networked IP (NIP) implementation, of which the present invention is a part, can be characterized as an extension to the INAP to include the handling and processing of non-voice media and the provision of non-call-related communication between the SCF and the IPs. NIP allows the SCF to be in total control of all store-and-forward (i.e. messaging) services such as voice mail, e-mail, SMS messages, etc. The protocol used for the NIP implementation is referred to hereafter as NIP-INAP. The NIP-INAP is an Ericssonspecific extension to the IN CS-1 standard.

Networked IPs

Figure 9:
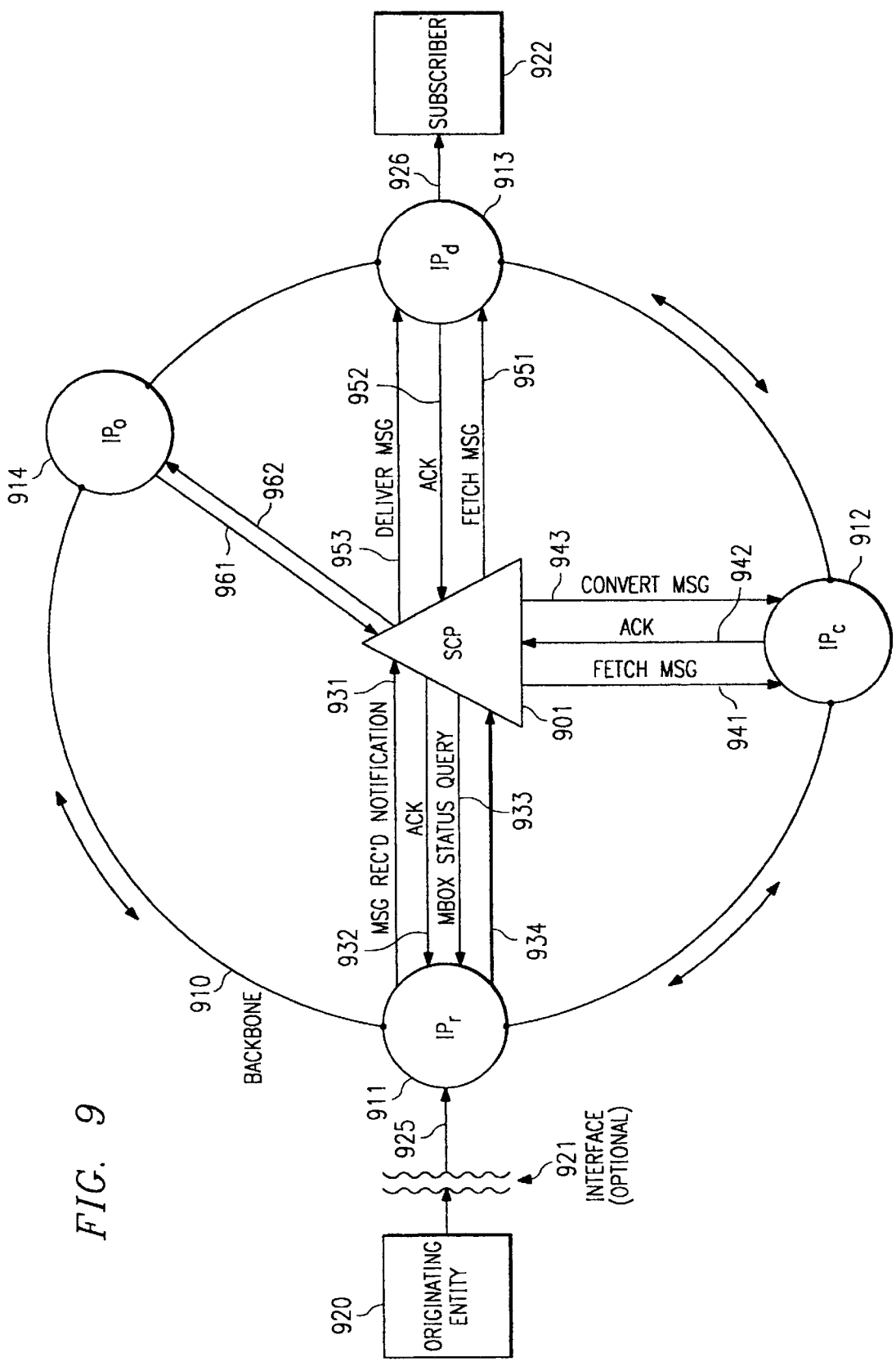
FIG. 9 shows one embodiment of the Networked IP (NIP) system and method of the present invention.

FIG. 9 shows one embodiment of the Networked IP (NIP) system of the present invention. A Networked IP system comprises an SCP 901 that can communicate with a plurality of Intelligent Peripherals (IPs) 911–914. Each of these logical IPs are SRFs in IN terminology, as noted earlier. For illustrative simplicity, only four IPs are shown in FIG. 9: a Receiving IP, $IP_r$ 911; a Conversion IP, $IP_c$ 912, a Delivery IP, $IP_d$ 913, and an exemplary additional IP, $IP_o$ 914. The IPs 911–914 communicate amongst each other over a communications backbone 910 using any protocol, for example, TCP/IP, X.25, etc.

FIG. 9 also provides an overview of the operation of an embodiment of the present invention. When an originating entity 920 sends a message to the receiving $IP_r$ 911 over an optional interface 921, $IP_r$ 911 stores the message that is received and notifies SCP 901 as shown by arrow 931. The SCP in turn acknowledges the notification at 932.

In an alternative embodiment of the present invention, the SCP 901 queries $IP_r$ 911 about the status of a subscriber's mailbox as shown at 933 and receives an answer from $IP_r$ 911 as indicated by the arrow 934. If the SCP 901 has advance knowledge of the delivery preference of a subscriber 922, it then instructs a conversion $IP_c$ 912 to fetch the message from the receiving $IP_r$ 911 as shown at 941. The conversion $IP_c$ 912 then communicates with the recipient $IP_r$ 911 over the backbone 910 and retrieves the stored message. The conversion $IP_c$ 912 acknowledges the execution of the fetch command at 942 to SCP 901.

The SCP 901 then issues a convert order to the conversion $IP_c$ 912 at 943. The Conversion IP 912 then converts the message based upon the subscriber's preference from the mode in which it was received to the mode in which a subscriber 922 wishes the message to be delivered. When the conversion is complete, the conversion $IP_c$ 912 notifies the SCP 901 as shown at 942.

Upon being notified that the medium of the message has been converted, the SCP then orders the delivery $IP_d$ 913 to fetch the converted message from the conversion $IP_c$ 912 as shown at 951. The delivery IP 913 retrieves the message from the conversion $IP_c$ 912 over the backbone 910 and acknowledges the completion of the process to SCP 901 as shown at 952.

The SCP 901 then orders the delivery $IP_d$ 913 to deliver the message to the subscriber 922 as indicated at 953. If the subscriber is active and accessible, the delivery IP, IP$_d$ 913 then delivers the message as shown at 926. The delivery of the message is also confirmed to the SCP 901 as shown at 952.

Figure 10:
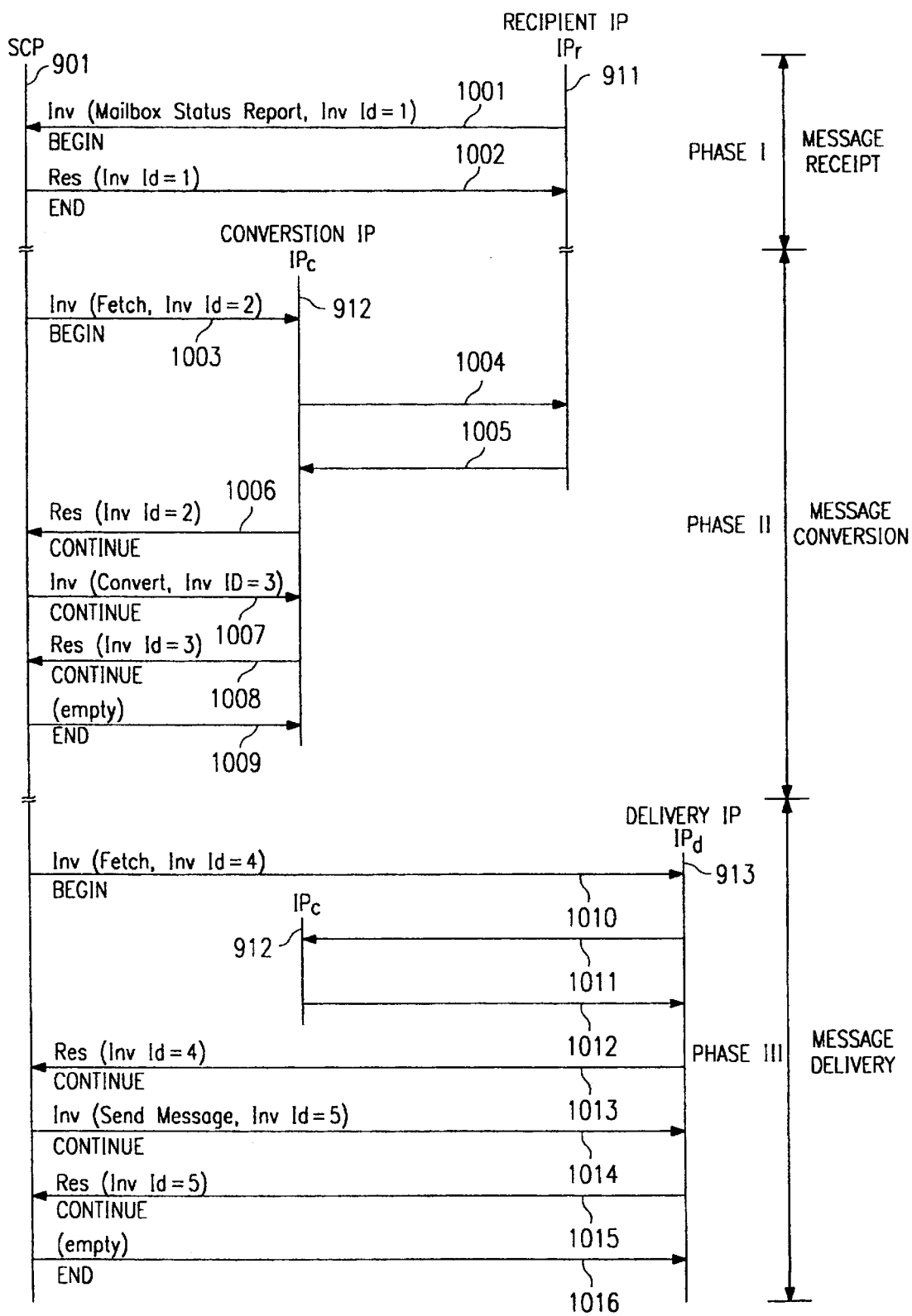
FIG. 10 is an overview sequence diagram illustrating the flow of messages between the various logical entities of the present invention.

FIG. 10 is an overview sequence diagram illustrating the flow of messages between the various logical entities of the present invention. As shown in FIG. 10, the conversion process comprises three phases. In the first phase, the Recipient IP, IP$_r$ 911 reports the receipt of a message to the SCP. In the second phase, the SCP orders the conversion IP, IP$_c$ 912 to retrieve the message from the Recipient IP, IP$_r$ 911 and to convert the message from one medium into another. In the third phase, the SCP orders the Delivery IP, IP$_d$ 913 to retrieve the converted message from the conversion IP, IP$_c$ 912 and to deliver it to the subscriber.

The communications between the SCP and the various IPs 911–913 is shown using Transaction Capabilities Application Part (TCAP) notation in FIG. 10, with the message type being shown below the arrow and the components of the TCAP message and the parameters being shown above each arrow. Thus, in the first phase, upon receiving a message, IP$_r$ 911 notifies the SCP 901 using the "Mailbox Status Report" command at 1001. This is acknowledged by the SCP back to IP$_r$ 911 at 1002.

In the second phase, the message conversion phase, the SCP 901 issues a "Fetch" command to the conversion IP, IP$_c$ 912 at 1003. The conversion IP, IP$_c$ 912 retrieves the message from IP$_r$ 911 as shown at 1004 and 1005 by using any protocol that is permitted on the network connecting the various IPs, for example, TCP/IP, X.25, etc. IP$_c$ 912 signals SCP 901 of completion of the message retrieval process at 1006. The SCP then issues the "Convert" command to IP$_c$ 912 at 1007. The IP$_c$ acknowledges completion of the Conversion process to the SCP at 1008 upon which the SCP 901 closes the dialogue with IP$_c$ 912 as shown at 1009.

In the third phase, the SCP issues a "Fetch" command to the Delivery IP, IP$_d$ 913 at 1010, upon which the delivery IP retrieves the converted message from IP$_c$ 912 again using any protocol considered valid on the IP network, as shown at 1011 and 1012. IP$_d$ notifies the SCP when the converted message has been fetched from IP$_c$, as shown at 1013. On or prior to establishing communications with the subscriber, the SCP then issues a "Send Message" command to the Delivery IP, IP$_d$, as shown at 1014. The IP$_d$ delivers the message to the subscriber and confirms that fact to the SCP at 1015, upon which the SCP closes the dialogue with IP$_d$ as shown at 1016. An IN subscriber may subscribe to several store-and-forward services, such as e-mail, facsimile mail, SMS, voice mail, etc., and may wish to have the delivery of these various message types to be coordinated. The various messages relating to different services subscribed to are usually stored at different physical or logical IPs in the IN network. Presently, conversion solutions are not generally available to permit different types of messages that are stored at different nodes to be retrieved, converted and delivered in a distributed manner, based upon a subscriber-specified conversion and delivery preference(s).

The present invention provides a solution for converting a message from one store-and-forward medium to another, and consequently, to move converted and unconverted messages between different IPs so that a subscriber can choose to have all or part of his or her messages delivered in one or more preferred media.

In one embodiment of the present invention, several new procedures are introduced into the INAP to assist in the effectuation of the conversion of a message from one store-and-forward medium to another. Such new procedures include: the "Fetch" command which enables the SCF to order an IP to fetch a message from another IP on the same network; the "Convert" command which enables the SCP to order an IP to convert a message from one medium to another; and the "Send Message" command which enables an SCP to order an IP to deliver an identified message (here, also a converted message) to a specific destination.

Mailboxes can exist for several different media, for example, voice mail, facsimile mail, e-mail, SMS, etc. In the present disclosure, each medium and its associated mailbox, is referred to as a logical IP. In order to control the messages received by a subscriber in his mailbox, and to facilitate the notification to the SCP or the subscriber when the status of a subscriber's mailbox changes, it typically is useful for the SCP to be informed about the status of a subscriber's mailboxes.

Presently, integrated messaging services that are implemented on different physical nodes cannot be readily provided. An embodiment of the present invention provides a networked solution based on the IN architecture by defining a protocol to implement unified mail solutions.

Another aspect of the present invention enables an SCP to be updated about the status of a subscriber's mailboxes. New procedures have also been introduced to the NIP-INAP for this purpose: the "Mailbox Status Report" command which enables an IP to notify the SCF when the status of a specific mailbox has changed; and the "Mailbox Status Enquiry" command which enables the SCP to poll or query an IP about the status of a particular subscriber mailbox on a particular medium.

Extensions to INAP Procedures

We will next consider the detailed operation of the various new procedures that are introduced to the NIP-INAP for the implementation of the preferred embodiment of the present invention. Before an SCP can order an IP to convert a message from one format to another, procedures are necessary to facilitate the notification of the SCP when a message has been received by an IP and to also permit an SCP to affirmatively determine the status of a subscriber's mailbox.

The "Mailbox Status Report" Message

The spontaneous report by an IP of the change in mailbox status of a subscriber is implemented by using the "Mailbox Status Report" command. As shown in FIG. 11, a Mailbox Status Report is sent from a receiving IP, IP$_r$ 911 to the SCP 901 upon any change of mailbox status as long as the change in status was not initiated or controlled by the SCP. However, when a message is deposited in a mailbox (i.e., it is received by the IP designated for receiving messages in a certain medium), the receiving IP generates a "Mailbox Status Report" message even if the SCP is in control.

It should be noted that at the time of issuance of this notification by the Receiving IP, IP$_r$ 911, there may or may not be an ongoing dialogue between the SCP 901 and IP$_r$ 911. In order for the IP$_r$ 911 to issue this message to the SCP, the status of a subscriber's mailbox must change. After receipt of this command by the SCP 901, further action is at the discretion of the SCP. If desired, the SCP may obtain detailed information about the status of various messages using the "Mailbox Status Enquiry" command that is discussed below.

The "Mailbox Status Enquiry" Message

In contrast to the "Mailbox Status Report" message, which is spontaneously generated by an IP upon any change in mailbox status, the "Mailbox Status Enquiry" message is triggered only by affirmative action by the SCP or upon affirmative subscriber enquiry about the status of his or her mailbox. FIGS. 12 and 13 show the sequence diagram when an SCP enquiries an IP about the status of a subscriber's mailbox. If $IP_r$ 911 has reported a change in mailbox status to SCP 901 using the "Mailbox Status Report" message discussed earlier, and if the SCP 901 desires to obtain more or detailed information about a subscriber's mailbox or mailboxes, there are two possible outcomes, as shown in FIGS. 12 and 13.

A query by the SCP 901 of the status of a subscriber's mailbox can be in one of two formats, referred to herein as either a request for brief information or a request for detailed information. An exemplary request for brief information about a subscriber's mailbox status would be a request for information about the total number of new messages in the mailbox. An exemplary request for detailed information about a subscriber's mailbox status would be a request for the date, time and length of each message in the mailbox.

If the SCP 901 asks $IP_r$ 911 for brief information about mailbox status, as shown at 1201, then $IP_r$ 911 can return the desired result to SCP 901 as shown at 1202 without segmentation of the results. Likewise, if the SCP queries $IP_r$ 911 for detailed information about mailbox status, and if no detailed information is available or if segmentation is unnecessary or not desired, then (as before) the $IP_r$ 911 returns the result in a unitary (i.e. unsegmented) message to SCP 901 as shown at 1202.

On the other hand, if the SCP 901 queries $IP_r$ 911 for detailed information about mailbox status and if segmentation is necessary, and if such information is available, then $IP_r$ 911 sends the information to SCP 901 in multiple segments, as shown in FIG. 13. The process starts with the SCP making a detailed enquiry of the $IP_r$ 911 at 1301. In response, $IP_r$ 911 sends part of the results to the SCP at 1302 and (optionally) indicates that still more information remains unavailable. Thereupon the SCP asks for the remaining information at 1303. $IP_r$ provides another standard Return Result segment at 1304 and (optionally) indicates that still more information remains available.

This process is successively repeated with the SCP 901 asking for more and more information from $IP_r$ as indicated at 1305 until $IP_r$ returns a Return Result component to the SCP as shown at 1306, indicating that no further information about mailbox status is available. When the SCF has obtained, assembled and analyzed the various segments of the result returned by $IP_r$, all further action on its part is at its own discretion.

In another embodiment of the present invention, the SCP may send a message to a particular recipient, or notify a mailbox owner of the results of the "Mailbox Status Enquiry" command on his mailbox.

The "Mailbox Status Enquiry" command can also be used to service a subscriber who enquires about the status of his or her mailbox or mailboxes. This is illustrated in FIG. 14 for the case when the returned result is not segmented, and in FIG. 15, when the returned result is segmented.

As depicted in FIG. 14, when a user wants to know the status of his mailbox, the SCP issues a "Mailbox Status Enquiry" command as shown at 1401 to $IP_r$ 911 asking for brief or detailed information as appropriate. If only brief information was asked for at 1401, if detailed information was asked but was not available or if detailed information was requested and segmentation is not necessary, $IP_r$ 911 returns the result of the enquiry to the SCP as shown at 1402 without segmentation of the results. Thereafter, further action is at the discretion of the SCP 901.

Figure 15:
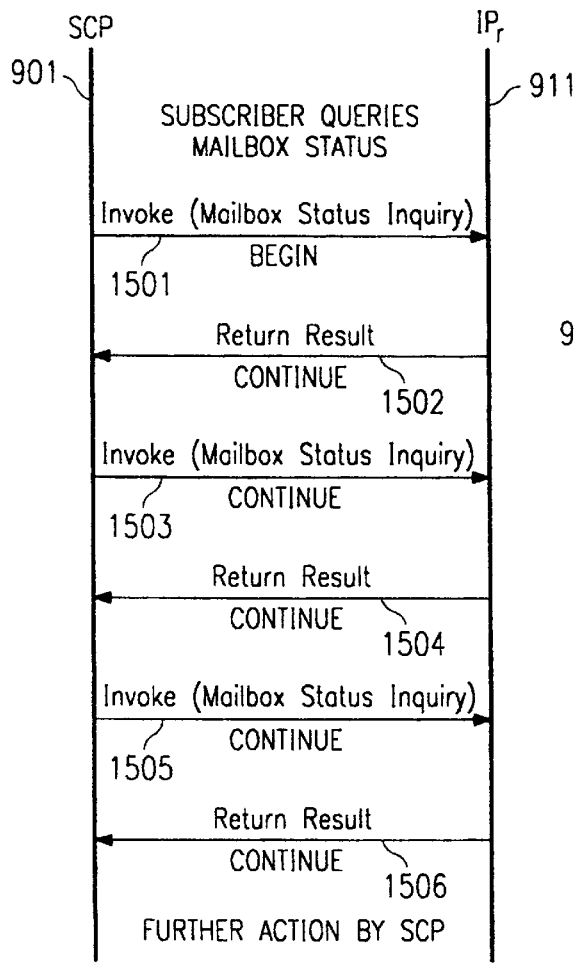
FIG. 15 is a sequence diagram illustrating the operation of the "Mailbox Status Inquiry" command when a subscriber asks for detailed information about mailbox status.

FIG. 15 shows a sequence diagram when a user makes a detailed enquiry about the status of his mailbox. Upon receiving the enquiry, SCP 901 issues a "Mailbox Status Enquiry" command to $IP_r$ 911, as shown at 1501, asking for detailed information about a particular mailbox or mailboxes. $IP_{r\ 911}$ segments the results to be returned, and sends the first segment back to the SCP as shown at 1502 and indicates that more information remains available. In response, the SCP invokes the "Mailbox Status Enquiry" command a second time at 1503 asking for some or part of the remaining information. The $IP_r$ 911 responds by returning the second Return Result component to the SCP as shown at 1504 indicating that there is still more information available.

As discussed earlier in connection with the description of the sequence diagram shown in FIG. 13, the SCP 901 repeatedly issues the "Mailbox Status Enquiry" command to $IP_r$ 911 as shown at 1505 until $IP_r$ 911 transmits a Return Result component as shown at 1506 indicating that no more information is available. The SCP then assembles and analyzes the segmented Return Result components and performs further actions at its own discretion.

The "Mailbox Status Report" and "Mailbox Status Enquiry" commands make it possible to initiate an alert to a subscriber when the status of his mailbox or mailboxes has changed and to centrally control all of the subscriber's various types of mailboxes despite the fact that they are located at logically distinct IPs.

We next consider the IN-controlled Media Conversion Services in further detail. Interconversion of messages stored in different media that are located at different IPs has long been desired by subscribers and telecommunications service providers. As indicated earlier, there are no procedures within the presently defined IN architecture that permit the interconversion of messages stored in different media and located at different IPs.

Operation of an embodiment of the present invention permits the interconversion of messages and different media stored at different IPs by introducing new procedures: the "Fetch" command which enables an SCP to order an IP to fetch a message from another IP; the "Convert" command which enables an SCP to order an IP to convert a message from one medium to another; and the "Send Message" command which enables an SCP to order an IP to transmit a specific converted message to an identified destination.

In the sequence diagrams presented below, a specific IP referred to as the Conversion IP, $IP_c$, is used for the interconversion of messages stored in different media. However, it should be emphasized that the actual conversion (or any other analogous SRF functionality) can take place either at the Conversion IP, at any IP supporting the desired medium, or at any other IP containing the necessary processing power and system resources. Furthermore, as explained earlier, each of the building blocks of the IN such as the SRF (the logical IP) is a separate logical entity which may, but need not, be physically integrated with the other entities of the telephone network, logical or otherwise.

The "Fetch" Command

Figure 16:
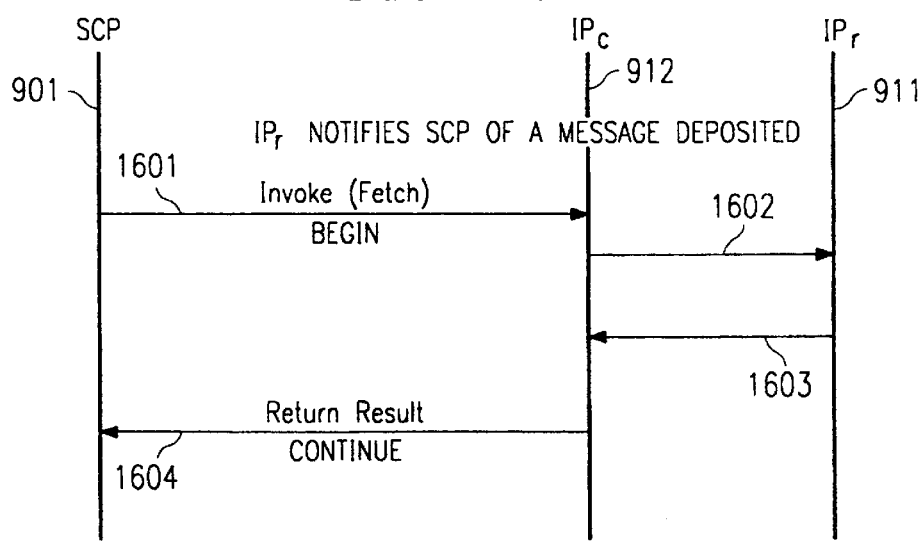
FIG. 16 shows the sequence diagram when the SCP orders an IP to fetch a message for conversion.

FIG. 16 shows the sequence diagram when an SCP orders an IP to fetch a message for a conversion. SCP 901 then orders a conversion IP, $IP_c$ 912 to fetch a message for conversion from another $IP_r$ 911 using the backbone network. The SCP issues a "Fetch" order to the Conversion $IP_c$ as shown at 1601 when a message has been deposited in a subscriber's mailbox and the SCP has been so informed by a "Mailbox Status Report" message from the Receiving $IP_r$ 911. Upon receiving the "Fetch" command, the Conversion IP fetches the message from the Recipient IP, $IP_r$, over the NIP backbone as shown at 1602 and 1603. When the retrieval of the message has been successfully completed, $IP_c$ signals the same to the SCP as shown at 1604.

The "Convert" Command

Figure 17:
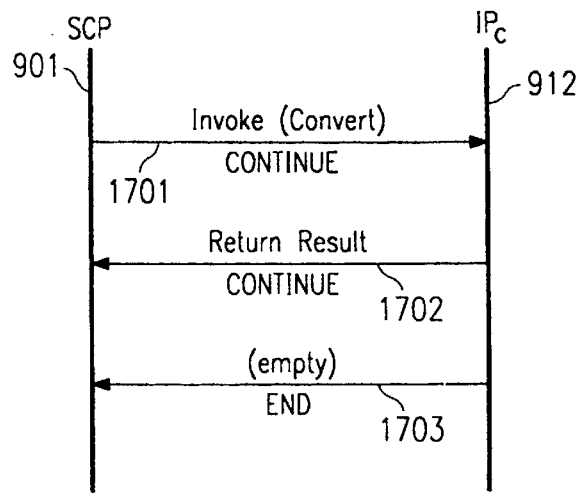
FIG. 17 shows the sequence diagram when the SCP orders a Conversion IP to convert a message.

FIG. 17 shows the sequence diagram when the SCP 901 orders a Conversion $IP_c$ 912 to convert a message. The process begins as shown at 1701 by the SCP issuing a "Convert" command to $IP_c$ 912. $IP_c$ 912 converts the message from the retrieved medium to the desired medium based upon a preference stored in the SCP or based upon a subscriber-activated conversion mode dialogue that is conducted by and through the SCP. After the conversion is completed, $IP_c$ notifies the SCP as shown at 1702 upon which the SCP closes the dialogue with the Conversion IP as indicated at 1703.

Figure 18:
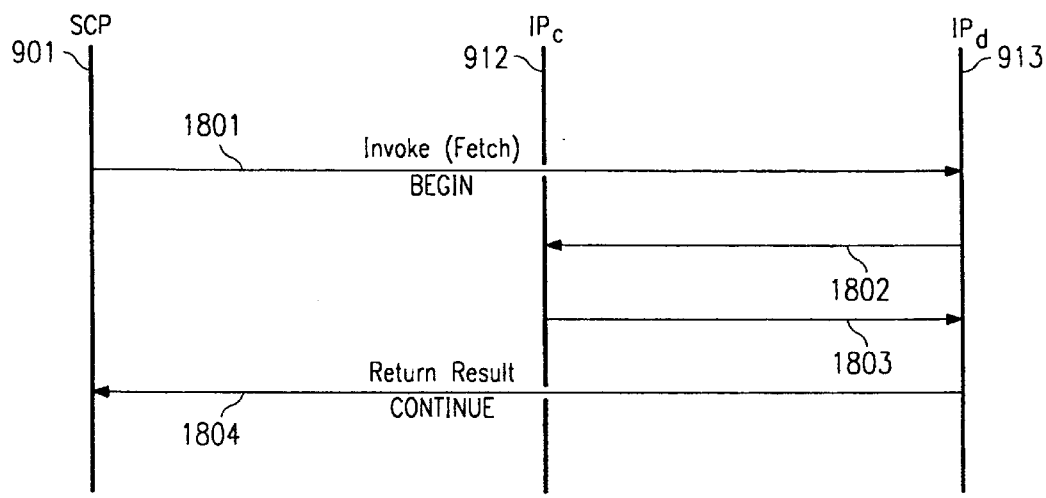
FIG. 18 shows the sequence diagram when the SCP orders the Delivery IP to fetch a converted message from the Conversion IP.

After the conversion is complete, the SCP 901 then orders the Delivery $IP_d$ 913 to fetch the converted message from the Conversion $IP_c$ 912. As shown in FIG. 18, the process starts with the SCF issuing the "Fetch" command to $IP_d$ at 1801, upon which $IP_d$ fetches the converted message from $IP_c$ via the backbone as indicated at 1802 and 1803. When the message has been fully retrieved, $IP_d$ notifies the SCP as shown at 1804.

The "Send Message" Command

Figure 19:
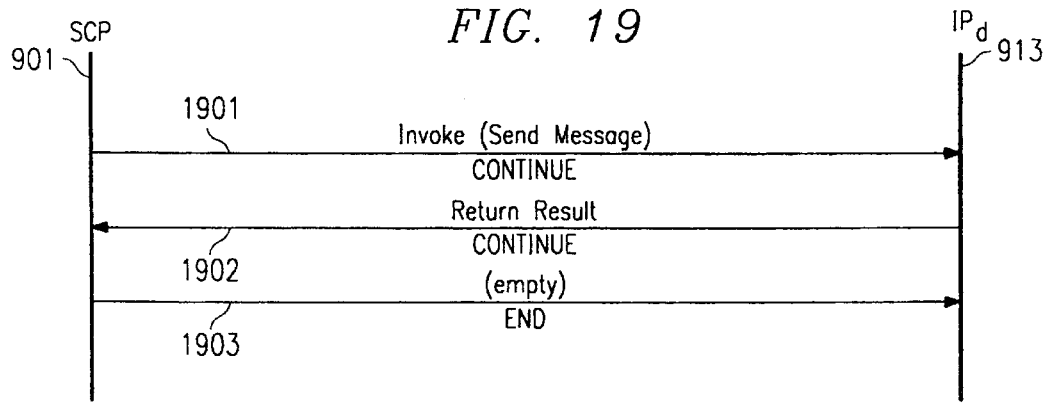
FIG. 19 shows the sequence diagram when the SCP orders the IP to deliver a converted message to a subscriber.

Finally, as shown in FIG. 19, the SCP 901 orders the $IP_d$ to deliver the converted message to a subscriber. This phase begins as shown at 1901 with the SCP issuing a "Send Message" command to $IP_d$ upon which $IP_d$ delivers the converted message to the subscriber and confirms the same to SCP 901 as shown at 1902. The process ends with the SCP closing the dialogue with $IP_d$ as shown at 1903.

The above-described system and method enables an SCP to control the conversion of messages received in one medium into another medium and to direct the delivery of a converted message. This makes it possible to store each subscriber's preferences regarding the medium in which messages should be delivered in a central location. An additional advantage of operation of an embodiment of the present invention is that it permits a subscriber to interactively prescribe the delivery medium for each message or to modify the results of an earlier medium conversion order.

SCP and IP Finite State Machines

Figure 20:
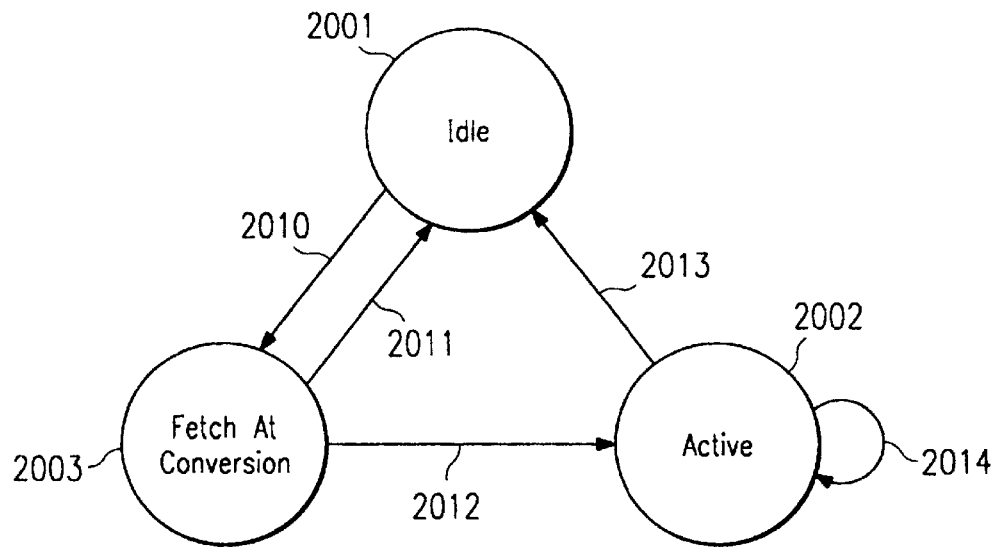
FIG. 20 shows the finite state machine for the SCP during the operation of the present invention.
Figure 21:
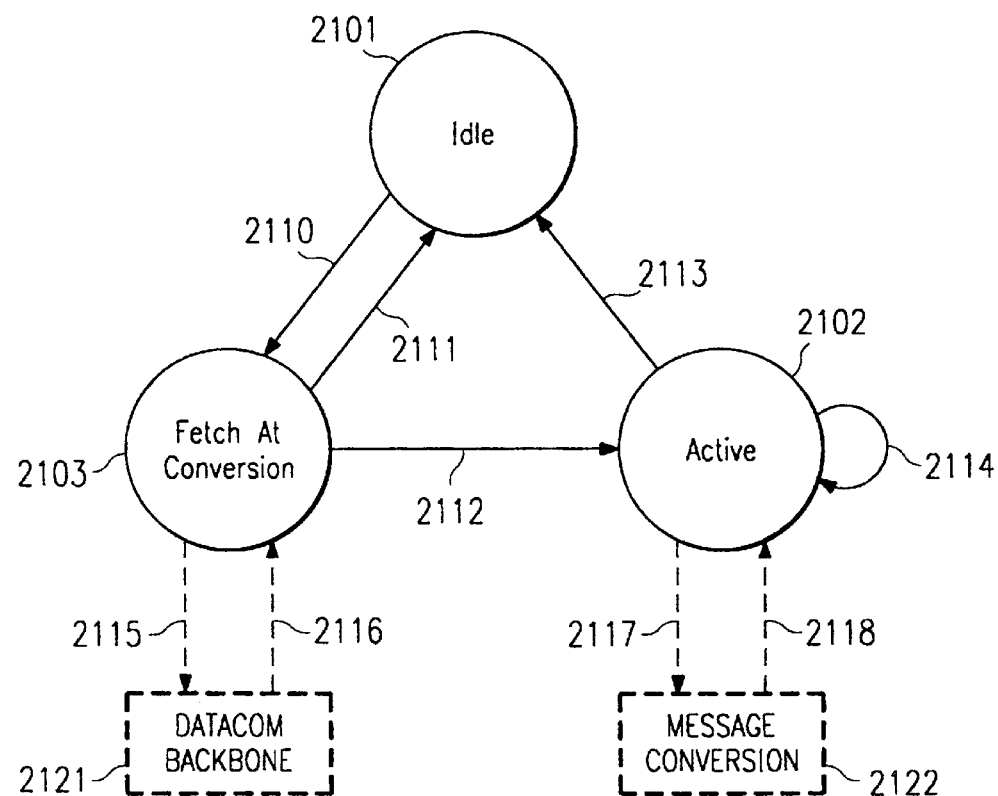
FIG. 21 shows the finite state machine for the IP during the operation of the present invention.

FIGS. 20 and 21 show the finite state machines for the SCP 901 and the various IPs 911–914 an embodiment of the present invention. In FIGS. 20 and 21, the states of the machine are symbolized with an oval, while events causing state transitions are drawn by continuous arrows. Functions are depicted within broken rectangles, while actions ordered by the functions are indicated by broken arrows.

FIG. 20 shows the finite state machine for the SCP. As can be seen, the SCP has three states: the Idle state 2001, the Active state 2002, and the Fetch At Conversion state 2003. The SCP goes from the Idle state 2001 to the Fetch At Conversion state 2003 upon the issuance of the "Fetch" command to the IP, as shown at 2010. The reverse state transition is occurs if the dialogue is aborted by the IP, or if the operation is timed out as shown at 2011.

The SCP goes from the Fetch At Conversion state 2003 to the Active state 2002 when the results of the Fetch are received from the IP as shown at 2012. The SCP loops (i.e. remains) in the Active state 2002 without any state transition upon the sending of a "Convert" message to $IP_c$, the receipt of the conversion results from $IP_c$, the sending of the "Send Message" delivery command to $IP_d$ and upon receipt of notification of completion of the same, as shown at 2014. The SCP goes from the Active state 2002 to the Idle state 2001 as shown at 2013 upon normal termination of the dialogue between the SCP and the IPs, if a dialogue were rejected due to the presence of improper components, if a dialogue is aborted from either side or if the operation is timed out.

FIG. 21 shows the finite state machine from the IP side. The IPs have three principal states: the Idle state 2101, the Active state 2102 and the Fetch At Conversion state 2103. There are also two additional quasi-states: the Retrieval Of Message over the data communications backbone shown at 2121, and the Message Conversion state 2122.

As shown in FIG. 21, the IP goes from Idle state 2101 to the Fetch At Conversion state 2103 upon receiving the "Fetch" command from the SCP 901, as shown at 2110. The opposite state transition occurs if the IP aborts the dialogue, as shown at 2111.

An IP goes from the Fetch At Conversion state 2103 to the Active state 2102 upon the results of the "Fetch" command being sent to the SCP 901, as shown at 2112. If an IP receives the "Fetch" command, the transition from the Idle state 2101 to the Fetch At Conversion state 2103 is additionally accompanied by the retrieval of the message over the data communications backbone as shown at 2115 and the confirmation of the completion of the task as shown at 2116.

An IP loops (i.e. remains) in the Active state 2102 upon receiving or confirming the "Send Message" command from or to the SCP 901. An IP also remains in the Active state 2102 upon receiving the "Convert" command from the SCP and upon returning the results of the conversion to the SCP.

Whenever an IP receives a "Convert" command from the SCP in addition to remaining in the Active state, it also causes it to make a quasi-state transition to the Message Conversion state 2122 as shown at 2117. When Message Conversion is complete, the quasi-state transition ends and the IP returns from the Message Conversion state 2122 back to the Active state 2102.

An IP transitions from the Active state 2102 to the Idle state 2101 upon normal termination of the dialogue by the SCP or upon rejection of an offered result by the SCP or upon an abort of the dialogue between an SCP and IP from either side.

Although a preferred embodiment of the method and apparatus of the present invention has been illustrated in the accompanying drawings and described in the foregoing detailed description, it is to be understood that the invention is not limited to the embodiments disclosed, but is capable of numerous rearrangements, modifications and substitutions without departing from the spirit of the invention as set forth and defined by the following claims.

What is claimed is:

1. In a method for communicating in an IN (Intelligent Network) telecommunications system comprising a plurality of IPs (Intelligent Peripherals) connected to an SCP (Service Control Point) over a network, said plurality of IPs being further connected to each other over a distinct telecommunications backbone, an improvement of a method for converting a received-form message formed in a first medium into a converted-form message formed in a second medium, said method comprising the steps of:

providing the received-form message formed in the first medium to a recipient IP;

transporting the received-form message from the recipient IP to a conversion IP;

converting the received-form message at the conversion IP into the converted-form message formed in the second medium;

transporting the converted form message to a delivery IP; and delivering the converted-form message formed in the second medium to the intended recipient of said message.

2. The method of claim 1 wherein at least two of the recipient IP to which the received-form message is provided, the conversion IP to which the received-form message is transported, and the delivery IP to which the converted-form message is transported are collocated.

3. The method of claim 1 wherein said IPs connected over a telecommunications backbone communicate with each other using the TCP/IP communications protocol.

4. The method of claim 1 wherein said IPs connected over a telecommunications backbone communicate with each other using the X.25 communications protocol.

5. The method of claim 1 wherein the received-form message comprises a non-call-related message.

6. The method of claim 1 wherein the received-form message is compatible with store-and-forward services.

7. The method of claim 1 wherein said first medium and said second medium are selected from the group consisting of voice-mail messages, e-mail messages, fax mail messages, messages in SMS (Short Message Service) format.

8. The method of claim 1 comprising the further intermediary step of notifying the SCP by the recipient IP of a change in status of a user's mailbox and wherein said step of transporting the received-form message from the recipient IP to the conversion IP is performed in response to a notification of the SCP during said step of notifying.

9. The method of claim 1 comprising the further step of querying the recipient IP regarding a status of a user's mailbox, and wherein said step of transporting the received-form message from said recipient IP to said conversion IP is performed in response to the query from the SCP during said step of querying.

10. The method of claim 1 wherein said step of transporting said received first message from said recipient IP to said conversion IP is performed using a FETCH command.

11. The method of claim 1 wherein said step of converting the received-form message into said converted-form message is performed in conformity with a subscriber's conversion and delivery preferences.

12. The method of claim 1 wherein said step of converting the received-form message into said converted-form message is performed using a CONVERT command.

13. The method of claim 1 wherein said step of delivering the converted-form second message formed in the second medium to the intended recipient of said message is performed using a SEND MESSAGE command.

14. In an IN (Intelligent Network) telecommunications system comprising a plurality of IPs (Intelligent Peripherals) connected to an SCP (Service Control Point) over a network, said plurality of IPs being further connected to each other over a distinct telecommunications backbone, a system for converting a first message received in a first medium into a second message in a second medium, said system comprising:

means for receiving said first message in said first medium into a recipient IP;

means for transporting said received first message from said recipient IP to a conversion IP;

means for converting said received first message in said conversion IP into said second message in said second medium;

means for transporting said converted second message to a delivery IP; and means for delivering said converted second message in said second medium to the intended recipient of said message.

15. The media conversion system of claim 14 wherein two or more of the group comprising said recipient IP, said conversion IP and said delivery IP are physically collocated.

16. The media conversion system of claim 14 wherein said IPs connected over a telecommunications backbone communicate with each other using the TCP/IP communications protocol.

17. The media conversion system of claim 14 wherein said IPs connected over a telecommunications backbone communicate with each other using the X.25 communications protocol.

18. The media conversion system of claim 14 wherein said first message is a non-call-related message.

19. The media conversion system of claim 14 wherein said first message is compatible with store-and-forward services.

20. The media conversion system of claim 14 wherein said first medium and said second medium are selected from the group consisting of voice-mail messages, e-mail messages, messages in SMS (Short Message Service) format.

21. The media conversion system of claim 14 wherein said means for transporting said received first message from the recipient IP to a conversion IP is responsive to a notification to an SCP by said recipient IP of a change in the status of an user's mailbox.

22. The media conversion system of claim 14 wherein said means for transporting said received first message from said recipient IP to said conversion IP is responsive to a query from an SCP to the recipient IP regarding the status of an user's mailbox.

23. The media conversion system of claim 14 wherein said means for transporting said received first message from said recipient IP to said conversion IP comprises a FETCH command.

24. The media conversion system of claim 14 wherein said means for converting said received first message into said converted second message additionally comprises means for conforming the conversion with a subscriber's conversion and delivery preferences.

25. The media conversion system of claim 14 wherein said means for converting said received first message into said converted second message comprises a CONVERT command.

26. The media conversion system of claim 14 wherein said means for delivering said converted second message in said second medium to the intended recipient of said message comprises a SEND MESSAGE command.

27. In an IN (Intelligent Network), apparatus for converting a received-form message formed in a first medium and originated by an originator into a converted-form message formed in a second medium, the converted-form message to be delivered to a subscriber, said apparatus comprising:

a recipient IP (Intelligent Peripheral) for receiving the received-form message originated by the originator;

a conversion IP (Intelligent Peripheral) coupled to said recipient IP, said conversion IP for converting the received-form message received by said recipient IP into the converted form message;

a delivery IP (Intelligent Peripheral) coupled to said recipient IP, said delivery IP for delivering the converted-form message to the subscriber; and an SCP (Service Control Point) coupled to said recipient IP, to said conversion IP, and to said delivery IP, said SCP for controlling transport of the received-form and converted-form message, respectively, between said recipient, conversion, and delivery IPs, respectively, and for controlling conversions performed by said conversion IP.

28. The apparatus of claim 27 wherein said SCP generates a fetch command to initiate transport of the received-form message from said recipient IP to said conversion IP.

29. The apparatus of claim 27 wherein said SCP generates a convert command to initiate conversion by said conversion IP of the received-form message into the converted-form message.

30. The apparatus of claim 27 wherein said SCP generates a fetch command to initiate transport of the converted-form message from said conversion IP to said delivery IP.

31. The apparatus of claim 27 wherein said SCP generates a send message command to initiate delivery by said delivery IP of the converted-form message to the subscriber.

32. The apparatus of claim 27 wherein the received-form message formed in the first medium comprises a first selected one of a voice-mail message, an e-mail message, fax mail message, and an SMS (Short Message Service) message, and wherein said conversion IP converts the received-form message formed of the first selected one into a second selected one of the voice-mail message, the e-mail message, and the SMS message.

33. The apparatus of claim 27 further comprising a subscriber preference storage device accessible by said SCP, said subscriber preference storage device for storing indications of a preferred medium in which the subscriber prefers the converted-form message to be delivered thereto, said SCP further for accessing said subscriber preference storage device to access the indications stored therein and for instructing said conversion IP to convert the received-form message into the converted-form message, the converted-form message formed in the preferred medium.

* * * * *

UNITED STATES PATENT AND TRADEMARK OFFICE
CERTIFICATE OF CORRECTION

PATENT NO. : 5,838,768
DATED : Nov. 17, 1998
INVENTOR(S) : Sumar et al.

It is certified that error appears in the above-identified patent and that said Letters Patent is hereby corrected as shown below:

Column 12, line 22    Replace "Ericssonspecific"
                      With --Ericsson-specific--

Column 17, line 52    After "transition"
                      Delete --is--

Signed and Sealed this

Tenth Day of August, 1999

Attest:

Attesting Officer

Q. TODD DICKINSON

Acting Commissioner of Patents and Trademarks